(No Model.)
G. M. KNIGHT.
WHEAT AND FLOUR SCALE.
No. 277,292. Patented May 8, 1883.
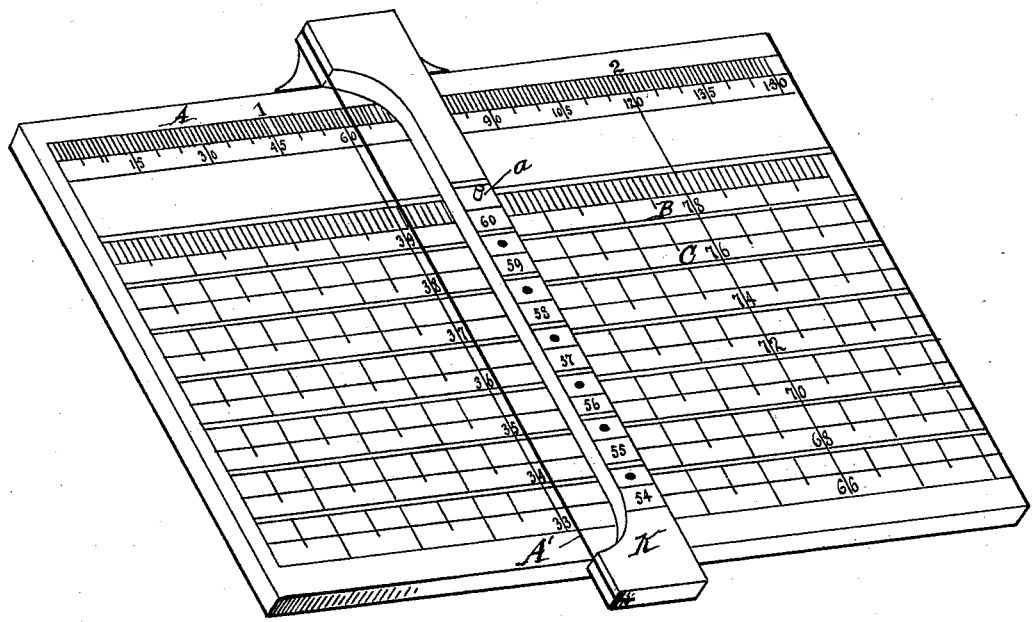
Attest:
A. Barthel
N. J. Sprague
Inventor:
Geo. M. Knight
per Thos. L. Sprague
Att'y.

UNITED STATES PATENT OFFICE.

GEORGE M. KNIGHT, OF ADRIAN, MICHIGAN.

WHEAT AND FLOUR SCALE.

SPECIFICATION forming part of Letters Patent No. 277,292, dated May 8, 1883.

Application filed June 10, 1882. (No model.)

*To all whom it may concern:*

Be it known that I, GEORGE M. KNIGHT, of Adrian, in the county of Lenawee and State of Michigan, have invented new and useful Improvements in a Wheat Scale and Gage; and I do hereby declare that the following is a full, clear, and exact description thereof, reference being had to the accompanying drawing, which forms a part of this specification.

The nature of this invention relates to certain new and useful improvements in a device for the purpose of determining, without mathematical calculation, and automatically, the value of wheat in flour; and the invention consists in the construction and operation of a scale, by means of which, the quantity and quality of the wheat being determined, the weight of flour to be exchanged for said wheat is immediately indicated, as more fully hereinafter described.

In the accompanying drawing my invention is shown in plan, wherein A represents a scale indicating the full weight of the wheat. B represents a scale indicating the weight of flour to be given in exchange for such wheat when the latter tests up to the highest grade, or sixty pounds to the bushel. C represents a scale indicating the same as the scale B when the wheat tests only fifty-nine pounds to the bushel, and so on down the scale, each succeeding scale indicating the decreasing value of a bushel of wheat, or a moiety thereof, as it decreases in test value.

In using the device, move the gage marked K, and which is movable, sliding on top of the scale, until the wire A' is vertical to the number corresponding to the weight of the wheat. Then, the wheat having been tested in the usual way and its grade determined, mark the same by placing the movable plug *a* in the hole in the gage over the amount that it tests, the gage being provided with holes for that purpose, as shown. The number of pounds of flour to be given to the customer for his wheat will be shown opposite the plug and immediately under the wire. For example, take sixty pounds of wheat which tests fifty-eight pounds in grade or value, place the wire over the number 60 in the scale A, place the plug in the hole immediately above the number 58 on the gage, and opposite this plug you will find the number 37, indicating the number of pounds of flour for the customer. If one hundred and twenty pounds of wheat are to be ground, the gage will be forced over that number in the scale A, and the amount of flour to be given in exchange will be readily designated, as shown. Any number of pounds of wheat may be so treated, it being understood that the squares upon the face of the device are all appropriately numbered, and the number of pounds of flour to be given will be shown, deriving their quantity from the corresponding part of the gage. This rule and scale is made for taking one-tenth toll, giving thirty-nine pounds of flour and twelve pounds of bran for full-test wheat. In localities where the law allows the miller a less toll than one-tenth, or more than that quantity, a similar scale can be made upon the same plan, only requiring the different scales to be varied to suit the circumstances. This scale will be found of great value in all custom or exchange flouring-mills, as it saves the constant making of mathematical calculations.

It will be observed that not only does this device readily and automatically indicate the number of pounds of flour to be given for a certain number of pounds of wheat of a certain grade—say sixty pounds to the bushel—but it also indicates the number of pounds of flour to be given for a specific number of pounds of wheat of lower grades.

What I claim is—

1. In a wheat scale or calculator, a plate having a horizontal scale to denote the number of pounds of wheat, and a series of parallel scales graduated from side to side in a ratio to correspond with the horizontal scale, and from top to bottom in a ratio to denote the quantity of flour to be given for a given quantity of grain, as denoted upon the scale upon a gage, K, having a vertical graduated scale to denote the quality of the wheat, in combination with said gage K, having the said scale and indicating-wire A', arranged at a distance from the edge of the gage to clearly show the figures on the plate, all constructed and arranged substantially as shown and described.

2. The combination of the main scale A and series of parallel scales B C, &c., with the sliding graduated gage K, having holes and a wire A', and the pin *a*, as and for the purposes set forth.

GEO. M. KNIGHT.

Witnesses:
H. S. SPRAGUE,
E. W. ANDREWS.